United States Patent [19]
Cwik

[11] Patent Number: 5,971,439
[45] Date of Patent: Oct. 26, 1999

[54] FLEXIBLE COUPLER APPARATUS

[75] Inventor: Scott Cwik, Carol Stream, Ill.

[73] Assignee: Senior Engineering Investments AG, Switzerland

[21] Appl. No.: 09/070,527

[22] Filed: Apr. 30, 1998

Related U.S. Application Data

[63] Continuation of application No. 08/784,042, Jan. 17, 1997, abandoned.

[51] Int. Cl.⁶ ..................................... F16L 11/12
[52] U.S. Cl. ........................... 285/49; 285/226; 285/300; 285/906
[58] Field of Search .............................. 285/49, 226, 299, 285/300, 301, 223, 233, 234, 906

[56] References Cited

U.S. PATENT DOCUMENTS

| | | | |
|---|---|---|---|
| 4,659,117 | 4/1987 | Holzhausen et al. | 285/226 X |
| 4,792,161 | 12/1988 | Usui | 285/223 X |
| 4,863,200 | 9/1989 | Brandener | 285/234 |
| 4,871,181 | 10/1989 | Usher et al. | 277/229 |
| 5,013,072 | 5/1991 | Roth | 285/233 |
| 5,090,746 | 2/1992 | Holhausen | 285/226 |
| 5,145,215 | 9/1992 | Udell | 285/226 X |
| 5,358,287 | 10/1994 | Winzen | 285/300 X |
| 5,482,230 | 1/1996 | Holzhausen | 285/226 |
| 5,482,330 | 1/1996 | Holzhausen | 285/226 |
| 5,506,376 | 4/1996 | Gödel | 181/208 |
| 5,511,828 | 4/1996 | Kurek et al. | 285/49 |

FOREIGN PATENT DOCUMENTS

| | | | |
|---|---|---|---|
| 575 727 | 12/1993 | European Pat. Off. | 27/10 |
| 575727 | 12/1993 | European Pat. Off. | 285/49 |
| 681 097 | 2/1995 | European Pat. Off. | 7/18 |
| 779371 | 4/1935 | France | 5/3 |
| 27 01 022 | 7/1978 | Germany | 7/8 |
| 93 07 142 U | 9/1993 | Germany | 27/107 |
| 43 18 343 | 12/1994 | Germany | 7/8 |
| 177066 | 10/1992 | Russian Federation | 285/49 |
| 1770666 | 10/1992 | U.S.S.R. | |
| 542 208 | 12/1941 | United Kingdom | |
| 542208 | 12/1941 | United Kingdom | 285/223 |
| 2 277 969 | 11/1994 | United Kingdom | 27/10 |
| 2277969 | 11/1994 | United Kingdom | 285/49 |
| 2 278 901 | 12/1994 | United Kingdom | 27/10 |
| 2278901 | 12/1994 | United Kingdom | 285/49 |

Primary Examiner—Dave W. Arola
Attorney, Agent, or Firm—Dick & Harris

[57] ABSTRACT

A flexible coupler apparatus for decoupling vibrations, for example, along the components of an internal combustion engine exhaust system. First and second adapter members are connected together to accommodate axial and flexural relative movement between two components of an exhaust system. One or more resilient spacer members associated with the adapter members substantially preclude transmission of vibrations from one adapter member to another. Means for imparting an axial bias are provided for giving progressive resilient resistance to compression and/or extension of the coupler apparatus from a preloaded, neutral position.

20 Claims, 4 Drawing Sheets

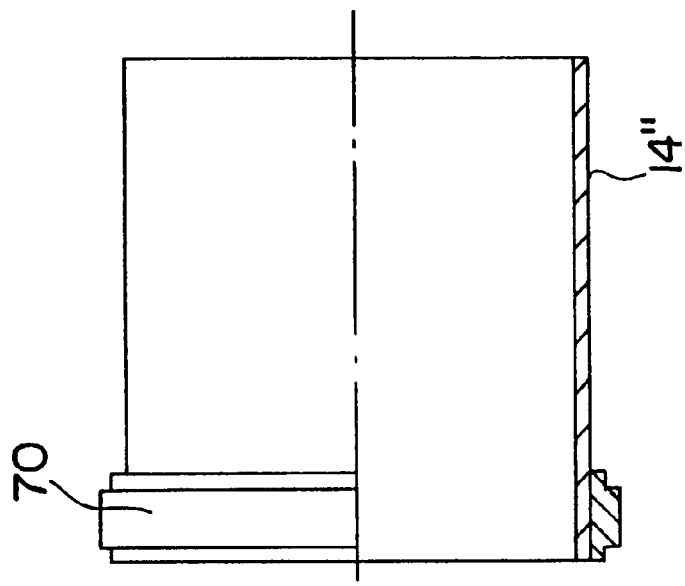
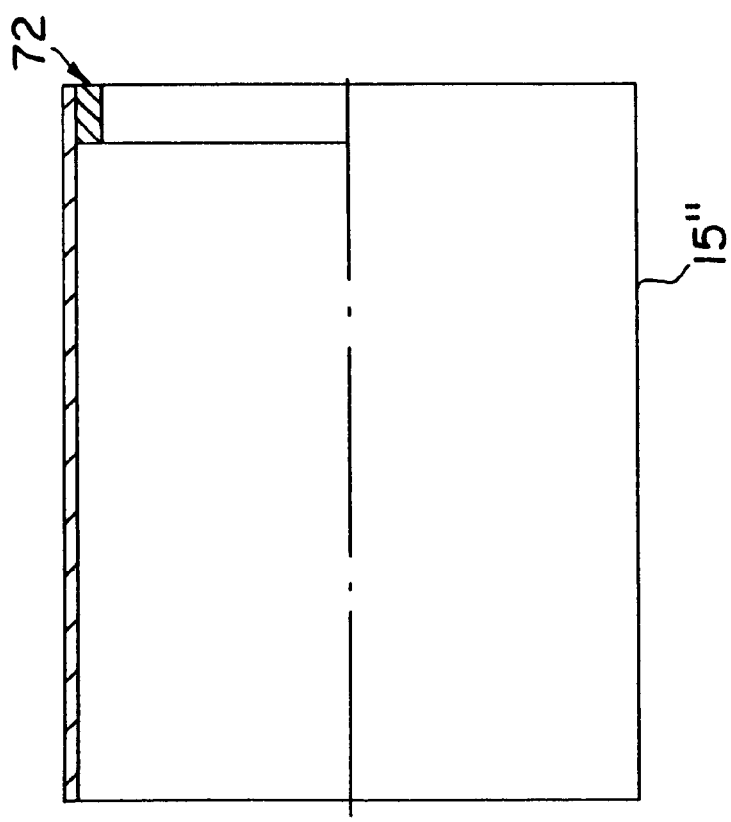

FLEXIBLE COUPLER APPARATUS

This application is a continuation of Ser. No. 08/784,042 filed Jan. 17, 1997, now abandoned.

BACKGROUND OF THE INVENTION

1. Field of the Invention

The present invention relates to couplers for joining the ends of successive lengths of pipe or conduit and/or connecting a pipe or conduit to a housing or other mounting surface wherein the connection will be exposed to axial transverse and bending vibrations. In particular, the present invention relates to couplers for joining pipes to one another or to other structures in exhaust systems for vehicles.

2. The Prior Art

It is well known that, in vehicle exhaust systems, particularly those for passenger vehicles which have high vibration engines, such as diesel vehicles, and heavy duty vehicles, such as large trucks or earth moving equipment, the internal combustion (i.c.) engines produces significant amount of vibration in the exhaust system. Operation of the motors at continuous speeds for prolonged periods of time can, especially, produce what are known as harmonic vibrations which can cause significant deflections in extended lengths of exhaust pipe and at locations where such pipes are mounted to structures such as brackets, engine manifolds, and the like. Repeated deflections and vibration along the exhaust pipe system can, in turn, cause the structures to weaken with time and ultimately fail. Further, such harmonic vibrations can also be transmitted through the exhaust pipes to the mountings of the pipes, promoting the loosening of the mountings, which can result in the sudden displacement of one or more components of the exhaust system, with the potential for both personal injury and equipment damage.

In addition to the vibrations caused by the operation of the motor of the vehicle, an exhaust system is also subjected to various tension, compression and bending forces which also arise during the operation of the vehicle. While individual exhaust system components could be made stronger and more massive to resist failure by fatigue, such constructions would be undesirable due to weight considerations. Further, by making individual elements stiffer, the vibrations are merely transmitted throughout the exhaust system to the mountings or other components and are not reduced or eliminated. Accordingly, it is desirable to isolate the exhaust system, or at least components of the system, from such vibrations and forces.

It is known that if the pipes of an exhaust system are divided and separated by non-rigid connections, rather than being constructed as continuous extended lengths, the development of harmonic vibrations from the motor is precluded or reduced. Such non-rigid connections can be advantageously employed to absorb other tension, compression and bending forces, apart from and in addition to the motor vibration.

It is therefore desirable to provide a coupler for joining a length of exhaust pipe, to another pipe or to a mounting, such as an engine manifold, which coupler joins the components in a non-rigid fashion and is capable of absorbing tension, compression, and bending forces, as well as the vibrational forces, without transmitting them from one exhaust system component to another.

An example of a prior art coupler is found in Usui, U.S. Pat. No. 4,792,161. In Usui, a pair of concentrically arranged spring coils are utilized to provide a mechanical connection between the pipes to be joined. One drawback of the coupler in Usui is that when the coils are in a stretched or bent configuration, gaps may form between individual bights of the coil, into which dirt, debris and moisture may invade, which may interfere with the operation of the coils through abrasion, rusting and so forth. In addition, the coils (which are arranged one threaded within the other) are unprotected and exposed to the elements at all times, and are thus susceptible to damage from abrasion and other harmful physical contact. A further drawback of the coupler apparatus of Usui is that a sealing ring positioned between the overlapping pipe ends, is relied upon to provide sealing means to prevent escape of the exhaust gases. The sealing ring is subjected to cyclical flexure, tension and compression forces which will ultimately comprise the seal and require replacement of the coupler.

Yet another prior art coupler apparatus is disclosed in Udell, U.S. Pat. No. 5,145,215. In Udell an inner sleeve member is concentrically received by an outer sleeve member. A substantially porous, non-sealing, vibration absorbing spacer member is arranged between the sleeve members where they overlap, to preclude direct contact between the sleeve members. The spacer member is non-sealing to preclude deterioration while minimizing interference with the reciprocation and articulation of the sleeve members. A flexible, extensible bellows member mechanically connects the sleeve members and at their distant, non-overlapped ends. A closure member, typically a braided metal wire, surrounds the bellows member for protecting the extensible bellows member for protecting the extensible bellows member from damage from external elements and forces.

While the apparatus of the Udell patent is capable of accommodating some extension, compression, and relative pivoting of the pipe ends or other fluid transmission members which are connected, the Udell apparatus is provided only with a single "resilient" single spacer member which is positioned axially and radially between radially extending flanges of the respective overlapping pipe ends. While the bellows member is capable of axial extension and compression as well as some bending to accommodate the movements of the respective overlapped pipe ends, the bellows member is not configured for providing a progressive resistance to either compression or extension of the coupler apparatus so as to tend to maintain the respective components of the coupler apparatus in a neutral configuration.

The "resilient" spacer member, being constructed of compressed steel wire mesh does not provide significant graduated damping of or progressive resistance to the axially directed vibrational forces when such forces are sufficiently strong to cause the connector to be compressed to an extreme orientation. In the possible, though typically uncommon, event of overcompression of the coupler, there is a possibility of jamming or distortion of components, which may adversely effect the subsequent performance of the coupler, and may even lead to premature degradation and/or failure of the coupler. There is no graduated damping mechanism to help resist and lessen the impact of such jamming forces.

It is desirable to provide a flexible coupler apparatus which has an enhanced, more robust configuration in order to provide for the decoupling of an exhaust system from a source of vibration, such as an internal combustion engine.

It is also desirable to provide a flexible coupler apparatus which is provided with a structure which will provide for the graduated damping of forces when such force is being imposed upon the coupler could result in overcompression or overextension of the flexible coupler apparatus.

It is further desirable to provide a flexible coupler apparatus which is provided with structure which will tend to restore the respective components of the coupler apparatus to a neutral configuration following rebound from any individual flexural, tensile or compressive force.

These and other objects of the invention will become apparent in view of the present specification including claims, and drawings.

SUMMARY OF THE INVENTION

The present invention comprises a flexible coupler apparatus for connecting adjacent ends of successive fluid transmission members to direct fluid flow from one of the two fluid transmission members to the other of the two fluid transmission members, while precluding transmission of vibration between the two fluid transmission members.

The flexible coupler apparatus comprises a first adapter member having a first end configured to be operably affixed to a first one of the two fluid transmission members, and a second free end. A second adapter member has a first end configured to be operably affixed to a second one of the two fluid transmission members, and a second free end. The second free ends of the first and second adapter members are operably configured so that the second free end of the first adapter member is insertingly received within the second free end of the second adapter member, so that at least a portion of the second free end of the second adapter member overlaps at least a portion of the second free end of the first adapter member.

The overlapping portions of the first and second adapter members are separated by an annular space to permit angular displacement therebetween, the first and second adapter members being operably arranged for axial and angular movement relative to each other to, in turn, accommodate axial and angular movement of the two fluid transmission members relative to each other. The first and second adapter members are operably arranged for axial movement relative to each other, for permitting the flexible coupler apparatus to move between at least a first fully extended configuration, and a second fully compressed configuration, along a direction parallel to a common longitudinal axis.

A first vibration absorbing spacer member is positioned radially between the first and second adapter members, within the annular space, for maintaining the first and second adapter members in radially spaced relation to each other along the overlapping portions of each and for precluding transmission of vibrations from the first and second adapter members to each other.

A first axial support member is operably associated with the second free end of the first adapter member, and a second axial support member operably associated with the second free end of the second adapter member, for maintaining the first vibration absorbing spacer member in axially bounded relationship therebetween.

At least one biasing support member is operably connected, at least indirectly, with at least one of the first and second adapter members. At least one axial biasing member operably disposed for bearing, at least indirectly, against the at least one biasing support member, for imparting an axial bias in the flexible coupler apparatus.

In a preferred embodiment of the invention, the first axial support member emanates radially outwardly from a position proximate the second free end of the first adapter member; and the second axial support member emanates radially inwardly from a position proximate the second free end of the second adapter member.

The flexible coupler apparatus further comprises, in one embodiment, the at least one biasing support member being operably disposed proximate the second free end of the first adapter member and extending radially outwardly toward the corresponding overlapping portion of the second free end of the second adapter member. The first spacer member is disposed axially between the at least one biasing support member, and the second axial support member; and the at least one axial biasing member being disposed to encircle at least a portion of the second free end of the first adapter member, between the at least one biasing support member and the first spacer member, for exerting a biasing force toward axially separating the at least one biasing support member and the first spacer member.

In another alternative embodiment of the invention, the at least one biasing support member is operably disposed proximate the second free end of the second adapter member and extending radially inwardly toward the corresponding overlapped portion of the second free end of the first adapter member; the first spacer member is disposed axially between the at least one biasing support member, and the first axial support member; and the at least one axial biasing member is disposed to encircle at least a portion of the second free end of the first adapter member, between the at least one biasing support member and the first spacer member, for exerting a biasing force toward axially separating the at least one biasing support member and the first spacer member.

In another alternative embodiment of the invention, the at least one biasing support member comprises a first biasing support member operably disposed proximate the second free end of the first adapter member and extending radially outwardly toward the corresponding overlapping portion of the second free end of the second adapter member, and a second biasing support member being operably disposed proximate the second free end of the second adapter member and extending radially inwardly toward the corresponding overlapped portion of the second free end of the first adapter member. The first spacer member is disposed axially between the first and second biasing support members. The at least one axial biasing member comprises a first axial biasing member disposed to encircle at least a portion of the second free end of the first adapter member, between the first biasing support member and the first spacer member, for exerting a biasing force toward axially separating the first biasing support member and the first spacer member, and a second axial biasing member disposed to encircle at least a portion of the second free end of the first adapter member, between the second biasing support member and the first spacer member, for exerting a biasing force toward axially separating the second biasing support member and the first spacer member.

The flexible coupler apparatus, in another alternative embodiment, comprises a third axial support member, operably associated with the first adapter member, and positioned distal to the second free end of the first adapter member such that the second axial support member is disposed axially between the second and third axial support members; and a second vibration absorbing spacer member, positioned at least radially around the first adapter member and axially between the second and third axial support members.

The at least one biasing support member is operably disposed proximate the second free end of the second adapter member, axially between the second spacer member and the second axial support member; and the at least one axial biasing member being disposed to encircle at least a portion of the second free end of the first adapter member, between the at least one biasing support member and the second spacer member, for exerting a biasing force toward axially separating the at least one biasing support member and the second spacer member.

Alternatively, the at least one biasing support member is operably disposed distal to the second free end of the first adapter member, axially between the second spacer member and the third axial support member; and the at least one axial biasing member being disposed to encircle at least a portion of the second free end of the first adapter member, between the at least one biasing support member and the second spacer member, for exerting a biasing force toward axially separating the at least one biasing support member and the second spacer member.

In another alternative embodiment, the at least one biasing support member comprises a first biasing support member operably disposed proximate the second free end of the second adapter member and extending radially inwardly toward the corresponding overlapped portion of the second free end of the second adapter member, and a second biasing support member being operably disposed distal the second free end of the first adapter member and disposed axially between the third axial support member and the first biasing support member. The second spacer member is disposed axially between the first and second biasing support members. The at least one axial biasing member comprises a first axial biasing member disposed to encircle at least a portion of the second free end of the first adapter member, between the first biasing support member and the second spacer member, for exerting a biasing force toward axially separating the first biasing support member and the second spacer member, and a second axial biasing member disposed to encircle at least a portion of the second free end of the first adapter member, between the second biasing support member and the second spacer member, for exerting a biasing force toward axially separating the second biasing support member and the second spacer member.

In still another alternative embodiment, the at least one biasing support member comprises a first biasing support member operably disposed proximate the second free end of the first adapter member, between the first spacer member and the first axial support member, and extending radially outwardly toward the corresponding overlapping portion of the second free end of the second adapter member, a second biasing support member being operably disposed proximate the second free end of the second adapter member, between the first spacer member and the second axial support member and extending radially inwardly toward the corresponding overlapped portion of the second free end of the first adapter member, a third biasing support member operably disposed proximate the second free end of the second adapter member, between the second spacer member and the second axial support member, and extending radially inwardly toward the corresponding overlapped portion of the second free end of the second adapter member, and a fourth biasing support member being operably disposed distal the second free end of the first adapter member and disposed between the third axial support member and the second spacer member. The first spacer member is disposed axially between the first and second biasing support members, and the second spacer member is disposed axially between the third and fourth biasing support members. The at least one axial biasing member comprises a first axial biasing member disposed to encircle at least a portion of the second free end of the first adapter member, between the first biasing support member and the first spacer member, for exerting a biasing force toward axially separating the first biasing support member and the first spacer member. A second axial biasing member is to encircle at least a portion of the second free end of the first adapter member, between the second biasing support member and the first spacer member, for exerting a biasing force toward axially separating the second biasing support member and the first spacer member. A third axial biasing member is disposed to encircle at least a portion of the second free end of the first adapter member, between the third biasing support member and the second spacer member, for exerting a biasing force toward axially separating the third biasing support member and the second spacer member, and a fourth axial biasing member disposed to encircle at least a portion of the second free end of the first adapter member, between the fourth biasing support member and the second spacer member, for exerting a biasing force toward axially separating the third biasing support member and the second spacer member.

Preferably, the flexible coupler apparatus also comprises a resilient sealing member affixed to the first and second adapter members, for maintaining the two adapter members in flexibly joined relation to each other to accommodate and enable substantial compressive and axial movement as well as angular movement of the outer and inner sleeve members to each other and to preclude escape of fluid from the flexible coupler apparatus. The resilient sealing member comprises a flexible tubular bellows member having formed therein a plurality of circumferential undulations along at least a portion of its length.

The first spacer member comprises a resilient annular member fabricated from metal wire mesh. Alternatively, the first spacer member comprises a resilient annular member fabricated from ceramic wool. Similarly, the second spacer member may be fabricated from metal wire mesh or ceramic wool.

Preferably, the at least one axial biasing member is a wave spring member. Alternatively, the at least one axial biasing member is a Belleville spring member.

In a preferred embodiment of the invention, at least one axial support member is formed as a rolled-over portion of the second free end of one of the first and second adapter members.

In a preferred embodiment of the invention, at least one axial biasing member is integrally formed as a portion of at least one of the first and second adapter members.

Alternatively, at least one axial support member is formed as a radially extending flange emanating from the second free end of one of the first and second adapter members.

BRIEF DESCRIPTION OF THE DRAWINGS

FIG. 7 is a side elevation, partially in section, illustrating an alternative embodiment of an axial support member.

FIG. 8 is a side elevation, partially in section, illustrating an alternative embodiment of an axial support member.

DETAILED DESCRIPTION OF THE DRAWINGS

Figure 1:
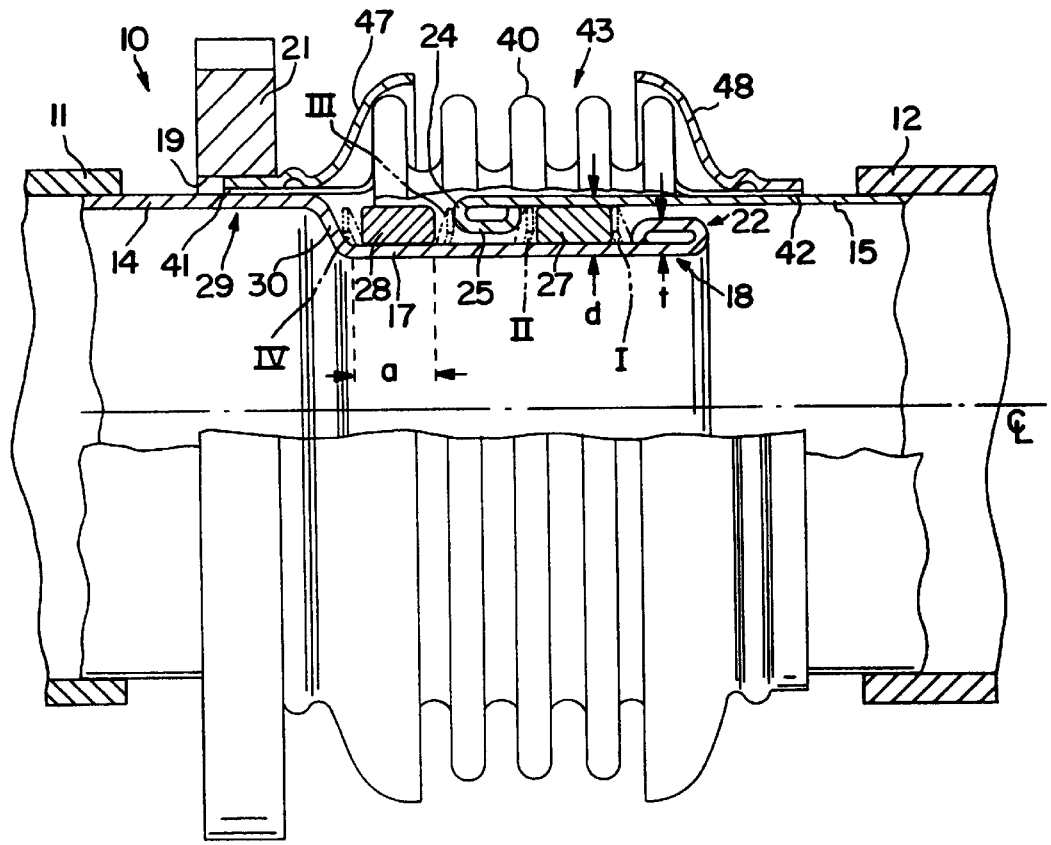
FIG. 1 is a side elevation, in section, of the flexible coupler apparatus according to the present invention.

While this invention is susceptible of embodiment in many different forms, there is shown herein in the drawings and will be described in detail several specific embodiments, with the understanding that the present disclosure is to be considered as an exemplification of the principles of the invention and is not intended to limit the invention to the embodiments illustrated.

FIG. 1 is a side elevation, in section, of the flexible coupler apparatus 10, according to the present invention. Inasmuch as apparatus 10 is, typically in a preferred embodiment of the invention, intended to be radially symmetrical about a central axis $C_L$, only an "upper" portion of coupler apparatus 10 is illustrated, with the understanding that the "lower" portion is symmetrically disposed about axis $C_L$. Alternatively, a flexible coupler apparatus may be formed from components (pipes, bellows, etc.) which are oval in cross-section, but symmetrical about perpendicularly intersecting axes. In such embodiments, typically the "long" axis of the cross-section is arranged horizontally, while the "short" axis is arranged vertically, in order to reduce the amounts of stress imposed upon the components, during engine roll and the like. Such oval configurations will still be symmetrical about a plane extending horizontally through the longitudinal axis of the coupler apparatus and so will have a side cross-sectional view similar if not identical to, that shown in the figures of the present application. Therefore, illustrations of such "oval" flexible coupler apparatus have been omitted as not being necessary for a complete understanding of the present invention. Persons of ordinary skill in the art having the present disclosure before them will be able to construct "oval" flexible coupler apparatus in accordance with the principles of the present invention, and such apparatus are deemed to be within the scope of the present claimed invention.

Two fluid transmission members, such as two pipes, have opening flanges or ends 11 and 12 that are to be connected, in such a manner that the fluid transmission members are decoupled with respect to the transmission of vibrations from fluid transmission member end 11 to fluid transmission member end 12. Fluid transmission member end 11 may, for example, emanate from an engine component such as an exhaust manifold. Apparatus 10 may be connected to fluid transmission member end 11, by for example, welding or otherwise sealingly connecting adapter member 14 to fluid transmission member end 11. Apparatus 10 may be supported by insertable receipt of one end of apparatus 10 through an aperture 19 in a mounting flange 21.

Figure 3:
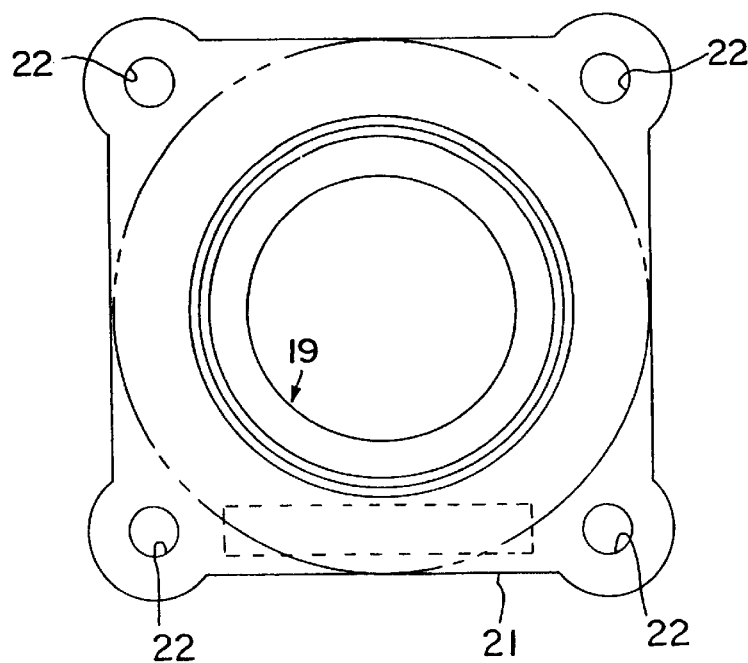
FIG. 3 is an elevation of a bracket member for attaching a flexible coupler apparatus according to the present invention.

Such a mounting flange 21 is shown in elevation in FIG. 3 and may be of generally conventional configuration, as such mounting flanges are known in the art. The flange may be affixed to a structure, such as the housing of an exhaust manifold (not shown) by bolts passing through bolt apertures 22. Typically, mounting flange 21 will be bolted to a relatively fixed portion of a vehicle structure, so fluid transmission member end 11 (at least in the vicinity of adapter member 14 and mounting flange 21) and adapter member 14 will be substantially rigidly fixed, and thus directly exposed to the vibrational, torsional and axial forces, to which flange 21 and whatever structure to which flange 21 is attached, are exposed.

Adapter members 14 and 15 are substantially cylindrical members, each having a diameter which is substantially the same as the respective fluid transmission member ends 11, 12. Adapter members 14 and 15 will be permanently affixed to ends 11, 12 by welding, brazing, or other suitable technique. Although illustrated in FIG. 1 as having diameters which are slightly less than ends 11 and 12, in alternative embodiments (not illustrated) adapter members 14, 15 could be configured as having diameters significantly greater than ends 11, 12, slightly less than that of ends 11, 12, or even having the same diameters as their respective ends 11, 12, in which case the adapter members would be butt-welded to the respective fluid transmission member ends.

One of adapter members 14 and 15, for example, adapter member 14, will have a narrowed portion 17, which, in addition, has at its free end 18, an outwardly rolled-over portion 22.

The other adapter member 15, may have a substantially constant diameter and will also include, at its free end 24, a rolled-over portion 25. Preferably, each rolled-over portion of the respective adapter members, such as, for example, rolled-over portion 22, will have a thickness "t" which is a substantial portion of the radial distance "d" between the free ends 22 and 24 of adapter members 14 and 15, respectively. Positioned axially between rolled-over portions 22 and 24 is a spacer member 27 which, in a preferred embodiment of the invention, may be formed from compressed metal mesh material. Alternatively, spacer member 27 may be formed from ceramic material, or other material which is slightly resilient and resistant to elevated temperatures such as are known in the environment of internal combustion engine exhaust systems. A further spacer member 28 is preferably positioned axially between rolled-over portion 24 and the transition region of adapter member 14 where the diameter of adapter member 14 is reduced from the full diameter region 29 and the reduced diameter region 17, so that spacer member 28 is axially bounded by the transition region 30 and rolled-over portion 24.

In a preferred embodiment of the invention, one or both of spacer members 27 and 28 will be formed as a annular, toroidal member, having a generally rectangular cross sectional configuration, as illustrated in FIG. 1, which may be provided with chamfers at its inner and/or outer edges of its end faces, for facilitating assembly.

Alternatively, the spacer members 27 and/or 28 may be provided with annular configurations in which the axial thickness "a" as indicated in FIG. 1 may be greater in some positions around the circumference of the spacer member than at other locations around the circumference of the spacer member. Such a spacer configuration having a variable axial thickness is disclosed and illustrated in copending U.S. patent application Ser. No. 08/569,354, the disclosure and illustrations thereof being hereby incorporated by reference in their entirety into the present application.

Spacer members 27, 28 will be configured to be resistively slightly compressible, to absorb and resist lateral vibrations, and axial vibrations, both then the pipes or pipe and housing or fixture being connected are substantially collinear, or moved by external forces to be rotated angularly relative to one another. Spacer members 27, 28 need not be porous, though they must be resilient to at least some degree, in order to accomplish the desired decoupling of vibration along the pipes being connected.

Bellows member 40 surrounds the free end of adapter members 14 and 15 and extends axially along each of adapter members 14 and 15 so as to substantially surround the entire region extending from transition region 30 of adapter member 14 beyond the free end 22 of adapter member 14 and, preferably extends for some additional distance, as may be desired or dictated by the physical requirements of the specific application, for some distance further. The cylindrical ends 41 and 42 of bellows member 40 are preferably, sealingly affixed throughout their circumference to the respective adapter members 14 and 15 by any suitable method such as welding, brazing and/or pressure forced fitting or crimping. The undulating portion 43 of bellows member 40 typically will have an axial length which is of the same order of magnitude and may be substantially equal to the axial distance between spacer member 28 and rolled-over portion 22. The length of undulating portion 43 relative to the other components of flexible coupler apparatus 10 may be varied in accordance with the particular requirements of specific applications.

Collar members 47 and 48 are provided to surround and protect the ends of the undulating portion 43 of bellows member 40, as well as to help affix and seal the cylindrical end 41 and 42 of bellows member 40 around respective adapter members 14 and 15. Collar members 47 and 48 may be affixed either to cylindrical ends 41 and 42 of bellows member 43, as illustrated, by any suitable method such as crimping, welding, brazing, forced fit, etc., so long as the fit is tight and secure. Alternatively, the collar members 47 and 48 may be affixed directly to adapter members 14 and 15, respectively (not shown) at positions axially separated from cylindrical ends 41 and 42, respectively, of bellows member 40.

In addition to the foregoing structure, the flexible coupler apparatus 10 of the present invention is further advantageously provided with preloading structure which provide for the axial positioning of adapter members 14 and 15, relative to one another, in a preferred specific position, in the absence of axially directed forces. This preloading mechanism also provides resistive damping force to help resist "slapping" or "jamming" which may occur under extreme circumstances of tensile or compressive force upon flexible coupler apparatus 10. Still further, the preloading structure will tend to restore adapter members 14 and 15 to their desired "normal" relative axial orientation during operation when flexible coupler apparatus 10 is exposed to the various vibrational axial and bending type forces.

Figure 2:
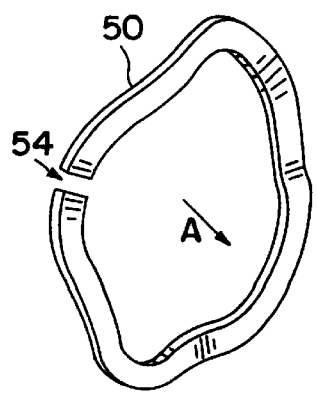
FIG. 2 is a perspective view of a damper member, according to the embodiment of FIG. 1 of the present invention.
Figure 4:
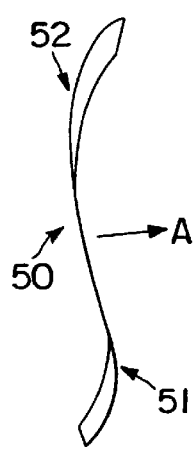
FIG. 4 is a side elevation of a spring member according to a preferred embodiment of the present invention.
Figure 6:
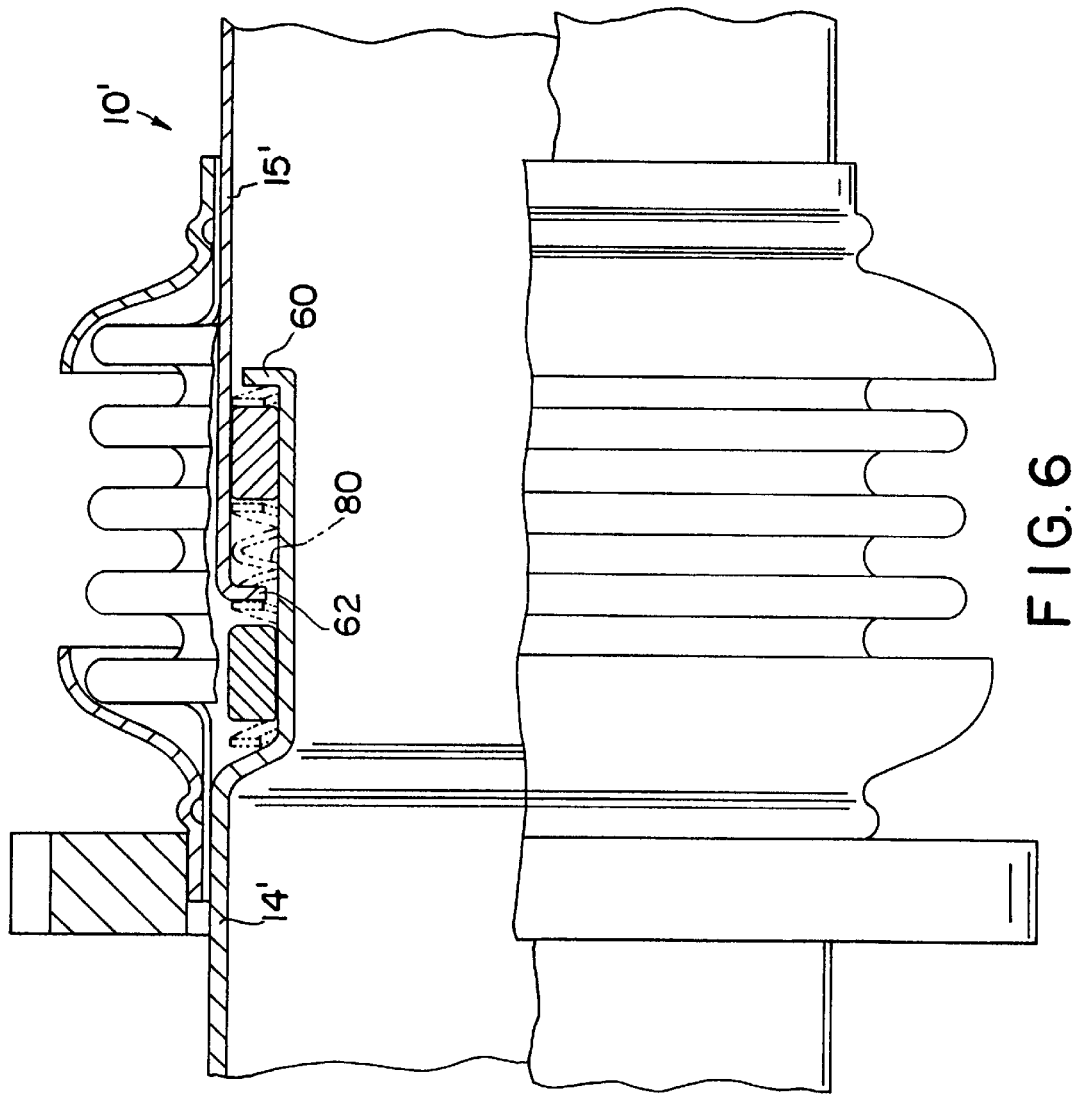
FIG. 6 is a side elevation, partially in section, illustrating an alternative embodiment of the flexible coupler apparatus.

In a preferred embodiment of the invention, the preloading structure is provided by one or more spring elements 50, such as that shown in FIG. 2. Each spring element 50 comprises a wave spring or wave washer having approximately a single turn, although wave springs having multiple turns may be employed by one of ordinary skill in the art, having the present disclosure before them, without departing from the principles of the present invention. Such a multi-turn wave spring 80 is illustrated in the embodiment of FIG. 6. As can be seen from the perspective view of FIG. 2, as well as the side elevation of FIG. 4, each spring member 50 is provided with a plurality of axially directed undulations, around the circumference of the spring member. In a preferred embodiment of the invention, the number of undulations are uniformly spaced around circumference of the spring member so as to provide a uniform distribution of "forward" undulations, indicated as location 51, and "rearward" undulations 52 about the circumference of the spring member 50. For a coupler having a nominal diameter of 2 inches, each spring member 50 would have a spring rate of 25–250 lbf./in. and preferably have a constant, linear spring rate. In addition to the spring force itself, friction between the spring member and the elements against which it abuts, further contributes to resistance to axial movement and damping of axial and/or radial vibrations.

In a preferred embodiment of the invention, one or more spring members 50 may be positioned at locations I, II, III or IV, so as to be positioned around narrowed portion 17 of adapter member 14, between rollover portion 22 and spacer 27, between spacer 27 and rolled-over portion 24, between rolled-over portion 24 and spacer member 28, and/or between spacer member 28 and transition region 30. As a most preferred position, a spring member 50 will be positioned at least in axial location III.

By placing one or more spring members 50 at one or more of the indicated axial positions I–IV, and spacing the elements so that each spring member is compressed, from slightly up to full compression, if desired, a preloading force is provided in flexible coupler apparatus 10 so that with respect to the particular rolled-over portions, spacer members and/or transition region 30 between which the spring member 50 is positioned, a preferred spacing is established whereupon axial compressive or tensile forces which would tend to drive the respective separated elements into contact with one another is resisted in a resilient, dampening manner, so as to slow and substantially preclude slapping axial abutment of the respective components and upon alleviation of the particular axial compressive or tensile force, the spring 50 will tend to restore the respective elements to their desired spacing.

In an embodiment of the invention in which the spring members 50 are positioned at axial positions I–IV, the entire flexible coupler apparatus structure is provided with a pre-load so that there is no free axial movement or "play" in the coupler apparatus. Instead, all of the respective elements are in desired predetermined spaced positions relative to their immediately adjacent spacer members, rolled-over portions, etc. When apparatus 10 is assembled, spring member(s) 50 is (are) placed in slight compression, on the order of 25–250 pounds. Upon application or either a compressive or tensile force, the respective spring members will flex permitting such deflection while providing resilient resistance to such axial force. Upon alleviation of the axial force, the various spring members 50 will tend to restore the elements of the flexible coupler apparatus to their predetermined desired axial orientations.

The presence of the spring member(s) 50 provides a progressive resistance to compressive forces and/or extension forces, depending upon the placement of the spring member(s) 50. By compressing the spring members upon manufacture, a preloading is provided, which tends to keep the components aligned and concentric, when at rest or during periods when the magnitude and/or frequency of the vibrations is low. Otherwise, during such operations, the components of the coupler apparatus might sag, or otherwise become loose, leading to chatter, "moaning" and/or other noisy and potentially damaging behavior.

In an alternative embodiment of the invention, the spring member 50 illustrated as being at axial position IV may be omitted since in some application environments, under excessive axial compressive force, pressure exerted by spacer member 28 toward transition region 30 may cause spring member 50 to ride up the incline of transition region 30, causing gap 54 in spring member 50 to widen, thus mitigating the preloading effectiveness of the spring member 50 at that location. In such an embodiment, wherein the spring member 50 is omitted at axial position IV, spacer member 28 may be provided with a uniformly or nonuniformly increased axial length in order to "take up" the gap which may be left from the omission of the spring member 50 at that location.

Although in the embodiment(s) illustrated in FIGS. 1–4, the adapter member portions (axial support members) which serve to axially bound the spacer members also serve to provide the surfaces against which the respective spring members bear (as biasing support members), it is within the contemplated scope of the invention, that substantially separate structures could be configured to serve for the axial support members and the biasing support members.

Figure 5:
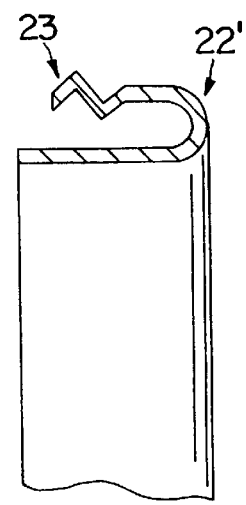
FIG. 5 is a fragmentary view, partially in section, of a free end of an adapter member, having a spring member integrally formed therein.

In an alternative embodiment of the invention, the spring members 50 positioned at axial positions I and/or II may be replaced by a spring structure which may be "built in" to rolled-over portion 22 and/or rolled-over portion 24. Such a spring structure may be provided in the manner illustrated in FIG. 5 wherein a fragmentary view of a portion of an alternative rolled-over portion 22' is illustrated having an undulating spring like portion 23.

In addition, the present invention is further advantageously provided with the rolled-over portions 22 and 24, instead of simple radially outwardly extending flanges, such as are known in the prior art. It has been observed that such simple, "flat" radially outwardly extended flanges have been on occasion susceptible to failure at the position where the flat radially outwardly extending flange emanates from the axially extending cylindrical portion of the corresponding adapter member.

In an alternative embodiment of the invention, radially outwardly extending flanges may be employed. As shown in FIG. 6, apparatus 10' (which may otherwise be substantially the same as apparatus 10 of FIGS. 1–4) has adapter members 14' and 15' which may be provided with flat annular portions 60, 62, which will perform the same functions as the rolled-over portions 22 and 24. Flat annular portions 60, 62 may be employed in applications in which the loads encountered by the flexible coupler apparatus are not as severe and/or in those circumstances when the overall package size is not as critical.

FIGS. 7 and 8 illustrate a further alternative to the use of rolled-over portions 22 and 24. In the embodiment of FIGS. 7 and 8, instead of rolled-over or simply turned-out extensions of the adapter members, rings 70, 72 which are separate pieces, are simply welded to the ends of adapter members 14", 155", with the remainder of the flexible coupler apparatus being configured and assembled substantially in the same manner as the embodiment of FIGS. 1–4.

It is believed that the flexible coupler apparatus according to the embodiments illustrated are better equipped to reduce and dampen axial vibrations and to maintain the flexible coupler apparatus in a biased, preloaded configuration, thus reducing slapping and play in the apparatus which has been known to occur in prior art coupler systems. In addition, the biasing springs can provide progressive resistance to extension and/or compression of the coupler, depending upon the location of the biasing spring(s).+

Although wave spring members are used in the preferred embodiments of the invention, alternative suitable known spring constructions, having similar operational characteristics may be employed without departing from the scope of the invention. Wave spring members of the type illustrated in this application can be obtained from Smalley Steel Ring Company of Wheeling, Ill.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

I claim:

1. A flexible coupler apparatus for connecting adjacent ends of successive fluid transmission members to direct fluid flow from one of the two fluid transmission members to the other of the two fluid transmission members, while precluding transmission of vibration between the two fluid transmission members, the flexible coupler apparatus comprising:

a first adapter member having a first end configured to be operably affixed to a first one of the two fluid transmission members, and a second free end;

a second adapter member having a first end configured to be operably affixed to a second one of the two fluid transmission members, and a second free end, the second free ends of the first and second adapter members being operably configured so that the second free end of the first adapter member is insertingly received within the second free end of the second adapter member, so that at least a portion of the second free end of the second adapter member overlaps at least a portion of the second free end of the first adapter member, the overlapping portions of the first and second adapter members being separated by an annular space to permit angular displacement therebetween, the first and second adapter members being operably arranged for axial and angular movement relative to each other to, in turn, accommodate axial and angular movement of the two fluid transmission members relative to each other, the first and second adapter members being operably arranged for axial movement relative to each other, for permitting the flexible coupler apparatus to move between at least a first fully extended configuration, and a second fully compressed configuration, along a direction parallel to a common longitudinal axis;

a first vibration absorbing spacer member, positioned radially between the first and second adapter members, within the annular space, for maintaining the first and second adapter members in radially spaced relation to each other along the overlapping portions of each and for precluding transmission of vibrations from the first and second adapter members to each other;

a first axial support member operably associated with the second free end of the first adapter member, and a second axial support member operably associated with the second free end of the second adapter member, for maintaining the first vibration absorbing spacer member in axially bounded relationship therebetween;

at least one biasing support member, operably connected, at least indirectly, with at least one of the first and second adapter members;

at least one axial biasing member operably disposed for bearing, at least indirectly, against the at least one biasing support member, for imparting an axial bias in the flexible coupler apparatus; and at least one resilient sealing member, operably affixed at two ends to the first and second adapter members, respectively, for maintaining the two adapter members in flexibly joined relation to each other and to accommodate and enable substantial compressive and axial movement as well as angular movement of the outer and inner sleeve members to each other and to preclude escape of fluid from the flexible coupler apparatus, the at least one resilient sealing member being disposed substantially circumferentially around and radially outwardly of said overlapping portions of the first and second adapter members, and said at least one axial biasing member.

2. The flexible coupler apparatus according to claim 1, wherein the first axial support member emanates radially outwardly from a position proximate the second free end of the first adapter member; and the second axial support member emanates radially inwardly from a position proximate the second free end of the second adapter member.

3. The flexible coupler apparatus according to claim 2, further comprising:

the at least one biasing support member being operably disposed proximate the second free end of the first adapter member and extending radially outwardly toward the corresponding overlapping portion of the second free end of the second adapter member;

the first spacer member being disposed axially between the at least one biasing support member, and the second axial support member; and the at least one axial biasing member being disposed to encircle at least a portion of the second free end of the first adapter member, between the at least one biasing support member and the first spacer member, for exerting a biasing force toward axially separating the at least one biasing support member and the first spacer member.

4. The flexible coupler apparatus according to claim 2, further comprising:

the at least one biasing support member being operably disposed proximate the second free end of the second adapter member and extending radially inwardly toward the corresponding overlapped portion of the second free end of the first adapter member;

the first spacer member being disposed axially between the at least one biasing support member, and the first axial support member; and the at least one axial biasing member being disposed to encircle at least a portion of the second free end of the first adapter member, between the at least one biasing support member and the first spacer member, for exerting a biasing force toward axially separating the at least one biasing support member and the first spacer member.

5. The flexible coupler apparatus according to claim 1, wherein the resilient sealing member comprises:

a flexible tubular bellows member having formed therein a plurality of circumferential undulations along at least a portion of its length.

6. The flexible coupler apparatus according to claim 1, wherein the first spacer member comprises:

a resilient annular member fabricated from metal wire mesh.

7. The flexible coupler apparatus according to claim 1, wherein the first spacer member comprises:

a resilient annular member fabricated from ceramic wool.

8. The flexible coupler apparatus according to claim 1, wherein the at least one axial biasing member is a Belleville spring member.

9. The flexible coupler apparatus according to claim 1, wherein at least one axial support member is formed as a radially extending flange emanating from the second free end of one of the first and second adapter members.

10. A flexible coupler apparatus for connecting adjacent ends of successive fluid transmission members to direct fluid flow from one of the two fluid transmission members to the other of the two fluid transmission members, while precluding transmission of vibration between the two fluid transmission members, the flexible coupler apparatus comprising:

a first adapter member having a first end configured to be operably affixed to a first one of the two fluid transmission members, and a second free end;

a second adapter member having a first end configured to be operably affixed to a second one of the two fluid transmission members, and a second free end, at least one resilient sealing member operably affixed to said first and second adaptor members to preclude escape of fluid from the flexible coupler apparatus, the second free ends of the first and second adapter members being operably configured so that the second free end of the first adapter member is insertingly received within the second free end of the second adapter member, so that at least a portion of the second free end of the second adapter member overlaps at least a portion of the second free end of the first adapter member, the overlapping portions of the first and second adapter members being separated by an annular space to permit angular displacement therebetween, the first and second adapter members being operably arranged for axial and angular movement relative to each other to, in turn, accommodate axial and angular movement of the two fluid transmission members relative to each other, the first and second adapter members being operably arranged for axial movement relative to each other, for permitting the flexible coupler apparatus to move between at least a first fully extended configuration, and a second fully compressed configuration, along a direction parallel to a common longitudinal axis;

a first vibration absorbing spacer member, Positioned radially between the first and second adapter members, within the annular space, for maintaining the first and second adapter members in radially spaced relation to each other along the overlapping portions of each and for precluding transmission of vibrations from the first and second adapter members to each other;

a first axial support member operably associated with the second free end of the first adapter member, and a second axial support member operably associated with the second free end of the second adapter member, for maintaining the first vibration absorbing spacer member in axially bounded relationship therebetween;

at least one biasing support member, operably connected, at least indirectly, with at least one of the first and second adapter members;

at least one axial biasing member operably disposed for bearing, at least indirectly, against the at least one biasing support member, for imparting an axial bias in the flexible coupler apparatus;

the first axial support member emanating radially outwardly from a position proximate the second free end of the first adapter member; the second axial support member emanating radially inwardly from a position proximate the second free end of the second adapter member;

the at least one biasing support member comprising a first biasing support member operably disposed proximate the second free end of the first adapter member and extending radially outwardly toward the corresponding overlapping portion of the second free end of the second adapter member, and a second biasing support member being operably disposed proximate the second free end of the second adapter member and extending radially inwardly toward the corresponding overlapped portion of the second free end of the first adapter member, the first spacer member being disposed axially between the first and second biasing support members; and wherein the at least one axial biasing member comprises a first axial biasing member disposed to encircle at least a portion of the second free end of the first adapter member, between the first biasing support member and the first spacer member, for exerting a biasing force toward axially separating the first biasing support member and the first spacer member, and a second axial biasing member disposed to encircle at least a portion of the second free end of the first adapter member, between the second biasing support member and the first spacer member, for exerting a biasing force toward axially separating the second biasing support member and the first spacer member.

11. A flexible coupler apparatus for connecting adjacent ends of successive fluid transmission members to direct fluid flow from one of the two fluid transmission members to the other of the two fluid transmission members, while precluding transmission of vibration between the two fluid transmission members, the flexible coupler apparatus comprising:

a first adapter member having a first end configured to be operably affixed to a first one of the two fluid transmission members, and a second free end;

a second adapter member having a first end configured to be operably affixed to a second one of the two fluid transmission members, and a second free end, at least one resilient sealing member operably affixed to said first and second adaptor members to preclude escape of fluid from the flexible coupler apparatus, the second free ends of the first and second adapter members being operably configured so that the second free end of the first adapter member is insertingly received within the second free end of the second adapter member, so that at least a portion of the second free end of the second adapter member overlaps at least a portion of the second free end of the first adapter member, the overlapping portions of the first and second adapter members being separated by an annular space to permit angular displacement therebetween, the first and second adapter members being operably arranged for axial and angular movement relative to each other to, in turn, accommodate axial and angular movement of the two fluid transmission members relative to each other, the first and second adapter members being operably arranged for axial movement relative to each other, for permitting the flexible coupler apparatus to move between at least a first fully extended configuration, and a second fully compressed configuration, along a direction parallel to a common longitudinal axis;

a first vibration absorbing spacer member, positioned radially between the first and second adapter members, within the annular space, for maintaining the first and second adapter members in radially spaced relation to each other along the overlapping portions of each and for precluding transmission of vibrations from the first and second adapter members to each other;

a first axial support member operably associated with the second free end of the first adapter member, and a second axial support member operably associated with the second free end of the second adapter member, for maintaining the first vibration absorbing spacer member in axially bounded relationship therebetween;

at least one biasing support member, operably connected, at least indirectly, with at least one of the first and second adapter members;

at least one axial biasing member operably disposed for bearing, at least indirectly, against the at least one biasing support member, for imparting an axial bias in the flexible coupler apparatus;

the first axial support member emanating radially outwardly from a position proximate the second free end of the first adapter member; the second axial support member emanating radially inwardly from a position proximate the second free end of the second adapter member; and a third axial support member, operably associated with the first adapter member, and positioned distal to the second free end of the first adapter member such that the second axial support member is disposed axially between the second and third axial support members;

a second vibration absorbing spacer member, positioned at least radially around the first adapter member and axially between the second and third axial support members.

12. The flexible coupler member according to claim 11, further comprising:

the at least one biasing support member being operably disposed proximate the second free end of the second adapter member, axially between the second spacer member and the second axial support member; and the at least one axial biasing member being disposed to encircle at least a portion of the second free end of the first adapter member, between the at least one biasing support member and the second spacer member, for exerting a biasing force toward axially separating the at least one biasing support member and the second spacer member.

13. The flexible coupler member according to claim 11, further comprising:

the at least one biasing support member being operably disposed distal to the second free end of the first adapter member, axially between the second spacer member and the third axial support member; and the at least one axial biasing member being disposed to encircle at least a portion of the second free end of the first adapter member, between the at least one biasing support member and the second spacer member, for exerting a biasing force toward axially separating the at least one biasing support member and the second spacer member.

14. The flexible coupler apparatus according to claim 11, wherein the at least one biasing support member comprises a first biasing support member operably disposed proximate the second free end of the second adapter member and extending radially inwardly toward the corresponding overlapped portion of the second free end of the second adapter member, and a second biasing support member being operably disposed distal the second free end of the first adapter member and disposed axially between the third axial support member and the first biasing support member, the second spacer member being disposed axially between the first and second biasing support members; and wherein the at least one axial biasing member comprises a first axial biasing member disposed to encircle at least a portion of the second free end of the first adapter member, between the first biasing support member and the second spacer member, for exerting a biasing force toward axially separating the first biasing support member and the second spacer member, and a second axial biasing member disposed to encircle at least a portion of the second free end of the first adapter member, between the second biasing support member and the second spacer member, for exerting a biasing force toward axially separating the second biasing support member and the second spacer member.

15. The flexible coupler apparatus according to claim 11, wherein the at least one biasing support member comprises a first biasing support member operably disposed proximate the second free end of the first adapter member, between the first spacer member and the first axial support member, and extending radially outwardly toward the corresponding overlapping portion of the second free end of the second adapter member, a second biasing support member being operably disposed proximate the second free end of the second adapter member, between the first spacer member and the second axial support member and extending radially inwardly toward the corresponding overlapped portion of the second free end of the first adapter member, a third biasing support member operably disposed proximate the second free end of the second adapter member, between the second spacer member and the second axial support member, and extending radially inwardly toward the corresponding overlapped portion of the second free end of the second adapter member, and a fourth biasing support member being operably disposed distal the second free end of the first adapter member and disposed between the third axial support member and the second spacer member, the first spacer member being disposed axially between the first and second biasing support members, the second spacer member being disposed axially between the third and fourth biasing support members;

the at least one axial biasing member comprises a first axial biasing member disposed to encircle at least a portion of the second free end of the first adapter member, between the first biasing support member and the first spacer member, for exerting a biasing force toward axially separating the first biasing support member and the first spacer member, a second axial biasing member disposed to encircle at least a portion of the second free end of the first adapter member, between the second biasing support member and the first spacer member, for exerting a biasing force toward axially separating the second biasing support member and the first spacer member, a third axial biasing member disposed to encircle at least a portion of the second free end of the first adapter member, between the third biasing support member and the second spacer member, for exerting a biasing force toward axially separating the third biasing support member and the second spacer member, and a fourth axial biasing member disposed to encircle at least a portion of the second free end of the first adapter member, between the fourth biasing support member and the second spacer member, for exerting a biasing force toward axially separating the third biasing support member and the second spacer member.

16. The flexible coupler apparatus according to claim 11, wherein the second spacer member comprises:

a resilient annular member fabricated from metal wire mesh.

17. The flexible coupler apparatus according to claim 11, wherein the second spacer member comprises:

a resilient annular member fabricated from ceramic wool.

18. A flexible coupler apparatus for connecting adjacent ends of successive fluid transmission members to direct fluid flow from one of the two fluid transmission members to the other of the two fluid transmission members, while precluding transmission of vibration between the two fluid transmission members, the flexible coupler apparatus comprising:

a first adapter member having a first end configured to be operably affixed to a first one of the two fluid transmission members, and a second free end;

a second adapter member having a first end configured to be operably affixed to a second one of the two fluid transmission members, and a second free end, at least one resilient sealing member operably affixed to said first and second adaptor members to preclude escape of fluid from the flexible coupler apparatus, the second free ends of the first and second adapter members being operably configured so that the second free end of the first adapter member is insertingly received within the second free end of the second adapter member, so that at least a portion of the second free end of the second adapter member overlaps at least a portion of the second free end of the first adapter member, the overlapping portions of the first and second adapter members being separated by an annular space to permit angular displacement therebetween, the first and second adapter members being operably arranged for axial and angular movement relative to each other to, in turn, accommodate axial and angular movement of the two fluid transmission members relative to each other, the first and second adapter members being operably arranged for axial movement relative to each other, for permitting the flexible coupler apparatus to move between at least a first fully extended configuration, and a second fully compressed configuration, along a direction parallel to a common longitudinal axis;

a first vibration absorbing spacer member, positioned radially between the first and second adapter members, within the annular space, for maintaining the first and second adapter members in radially spaced relation to each other along the overlapping portions of each and for precluding transmission of vibrations from the first and second adapter members to each other;

a first axial support member operably associated with the second free end of the first adapter member, and a second axial support member operably associated with the second free end of the second adapter member, for maintaining the first vibration absorbing spacer member in axially bounded relationship therebetween;

at least one biasing support member, operably connected, at least indirectly, with at least one of the first and second adapter members;

at least one axial biasing member operably disposed for bearing, at least indirectly, against the at least one biasing support member, for imparting an axial bias in the flexible coupler apparatus;

the at least one axial biasing member being a wave spring member.

19. A flexible coupler apparatus for connecting adjacent ends of successive fluid transmission members to direct fluid flow from one of the two fluid transmission members to the other of the two fluid transmission members, while precluding transmission of vibration between the two fluid transmission members, the flexible coupler apparatus comprising:

a first adapter member having a first end configured to be operably affixed to a first one of the two fluid transmission members, and a second free end;

a second adapter member having a first end configured to be operably affixed to a second one of the two fluid transmission members, and a second free end, at least one resilient sealing member operably affixed to said first and second adaptor members to preclude escape of fluid from the flexible coupler apparatus, the second free ends of the first and second adapter members being operably configured so that the second free end of the first adapter member is insertingly received within the second free end of the second adapter member, so that at least a portion of the second free end of the second adapter member overlaps at least a portion of the second free end of the first adapter member, the overlapping portions of the first and second adapter members being separated by an annular space to permit angular displacement therebetween, the first and second adapter members being operably arranged for axial and angular movement relative to each other to, in turn, accommodate axial and angular movement of the two fluid transmission members relative to each other, the first and second adapter members being operably arranged for axial movement relative to each other, for permitting the flexible coupler apparatus to move between at least a first fully extended configuration, and a second fully compressed configuration, along a direction parallel to a common longitudinal axis;

a first vibration absorbing spacer member, positioned radially between the first and second adapter members, within the annular space, for maintaining the first and second adapter members in radially spaced relation to each other along the overlapping portions of each and for precluding transmission of vibrations from the first and second adapter members to each other;

a first axial support member operably associated with the second free end of the first adapter member, and a second axial support member operably associated with the second free end of the second adapter member, for maintaining the first vibration absorbing spacer member in axially bounded relationship therebetween;

at least one biasing support member, operably connected, at least indirectly, with at least one of the first and second adapter members;

at least one axial biasing member operably disposed for bearing, at least indirectly, against the at least one biasing support member, for imparting an axial bias in the flexible coupler apparatus;

at least one axial support member being formed as a rolled-over portion of the second free end of one of the first and second adapter members.

20. A flexible coupler apparatus for connecting adjacent ends of successive fluid transmission members to direct fluid flow from one of the two fluid transmission members to the other of the two fluid transmission members, while precluding transmission of vibration between the two fluid transmission members, the flexible coupler apparatus comprising:

a first adapter member having a first end configured to be operably affixed to a first one of the two fluid transmission members, and a second free end;

a second adapter member having a first end configured to be operably affixed to a second one of the two fluid transmission members, and a second free end, at least one resilient sealing member operably affixed to said first and second adaptor members to preclude escape of fluid from the flexible coupler apparatus, the second free ends of the first and second adapter members being operably configured so that the second free end of the first adapter member is insertingly received within the second free end of the second adapter member, so that at least a portion of the second free end of the second adapter member overlaps at least a portion of the second free end of the first adapter member, the overlapping portions of the first and second adapter members being separated by an annular space to permit angular displacement therebetween, the first and second adapter members being operably arranged for axial and angular movement relative to each other to, in turn, accommodate axial and angular movement of the two fluid transmission members relative to each other, the first and second adapter members being operably arranged for axial movement relative to each other, for permitting the flexible coupler apparatus to move between at least a first fully extended configuration, and a second fully compressed configuration, along a direction parallel to a common longitudinal axis;

a first vibration absorbing spacer member, positioned radially between the first and second adapter members, within the annular space, for maintaining the first and second adapter members in radially spaced relation to each other along the overlapping portions of each and for precluding transmission of vibrations from the first and second adapter members to each other;

a first axial support member operably associated with the second free end of the first adapter member, and a second axial support member operably associated with the second free end of the second adapter member, for maintaining the first vibration absorbing spacer member in axially bounded relationship therebetween;

at least one biasing support member, operably connected, at least indirectly, with at least one of the first and second adapter members;

at least one axial biasing member operably disposed for bearing, at least indirectly, against the at least one biasing support member, for imparting an axial bias in the flexible coupler apparatus;

at least one axial biasing member being integrally formed as a portion of at least one of the first and second adapter members, distinct from, but operably associated with one of the first and second axial support members.

* * * * *

UNITED STATES PATENT AND TRADEMARK OFFICE
CERTIFICATE OF CORRECTION

PATENT NO. : 5,971,439
DATED : October 26, 1999
INVENTOR(S) : Cwik

It is certified that error appears in the above-identified patent and that said Letters Patent is hereby corrected as shown below:

Column 11,
Line 45, delete "155" and insert -- 15 --

Column 14,
Line 37, delete "Positioned" and insert -- positioned --

Signed and Sealed this

Twenty-first Day of May, 2002

Attest:

Attesting Officer

JAMES E. ROGAN
Director of the United States Patent and Trademark Office